US011312482B2

(12) United States Patent
Bacon

(10) Patent No.: US 11,312,482 B2
(45) Date of Patent: Apr. 26, 2022

(54) COMPONENT ALIGNMENT SYSTEMS FOR AIRCRAFT

(71) Applicant: Textron Innovations Inc., Providence, RI (US)

(72) Inventor: Bruce Bennett Bacon, Euless, TX (US)

(73) Assignee: Textron Innovations Inc., Providence, RI (US)

(*) Notice: Subject to any disclaimer, the term of this patent is extended or adjusted under 35 U.S.C. 154(b) by 250 days.

(21) Appl. No.: 16/449,373

(22) Filed: Jun. 22, 2019

(65) Prior Publication Data

US 2020/0398973 A1 Dec. 24, 2020

(51) Int. Cl.
*B64C 25/20* (2006.01)
*B64C 1/14* (2006.01)
*F16B 5/02* (2006.01)
*B64C 25/16* (2006.01)

(52) U.S. Cl.
CPC ............ *B64C 25/20* (2013.01); *B64C 1/1461* (2013.01); *F16B 5/0225* (2013.01); *B64C 25/16* (2013.01)

(58) Field of Classification Search
CPC ....... B64C 25/20; B64C 1/1461; B64C 25/16; B64C 25/00; B64C 1/00; F16B 5/0225; F16B 2001/0092; F16B 5/02; B64F 5/10; Y10T 403/7045; Y10T 403/12; Y10T 403/125
See application file for complete search history.

(56) References Cited

U.S. PATENT DOCUMENTS

| | | | |
|---|---|---|---|
| 2,846,250 A * | 8/1958 | Davis | F16B 5/0225 403/108 |
| 3,019,472 A * | 2/1962 | Wasmuth | E05D 7/04 16/249 |
| 3,101,517 A | 8/1963 | Marvin et al. | |
| 3,192,589 A | 7/1965 | Pearson | |
| 3,899,805 A | 8/1975 | Mcmillan | |
| 4,035,093 A * | 7/1977 | Redshaw | F16B 5/0225 403/4 |
| 4,670,960 A | 6/1987 | Provost | |
| 4,732,050 A * | 3/1988 | Vollmer | B62D 1/184 280/775 |
| 4,946,527 A | 8/1990 | Battrell | |
| 5,482,228 A * | 1/1996 | Hoshino | B64C 25/16 244/102 A |
| 5,625,929 A | 5/1997 | Hattori et al. | |
| 5,983,467 A | 11/1999 | Duffy | |
| 7,857,565 B2 * | 12/2010 | Martinson | F16B 43/00 411/136 |

(Continued)

*Primary Examiner* — Medhat Badawi
*Assistant Examiner* — Vicente Rodriguez
(74) *Attorney, Agent, or Firm* — Lawrence Youst PLLC

(57) ABSTRACT

A component alignment system for an aircraft includes a first component having a first surface including first shaped projections that repeat in at least two directions along the first surface. The component alignment system also includes a second component having a second surface including second shaped projections that repeat in at least two directions along the second surface. The first shaped projections are complementary to the second shaped projections such that the first surface is translationally and rotationally constrained relative to the second surface when the first and second shaped projections are in an interlocked position.

15 Claims, 13 Drawing Sheets

(56) References Cited

U.S. PATENT DOCUMENTS

| | | | |
|---|---|---|---|
| 8,991,759 B2* | 3/2015 | Garcia Patino | B64C 1/0685 |
| | | | 244/120 |
| 9,121,436 B2* | 9/2015 | Hahner | F16B 5/0225 |
| 2005/0183248 A1 | 8/2005 | Gallant et al. | |
| 2016/0129995 A1* | 5/2016 | Lv | B64C 25/10 |
| | | | 244/102 A |

* cited by examiner

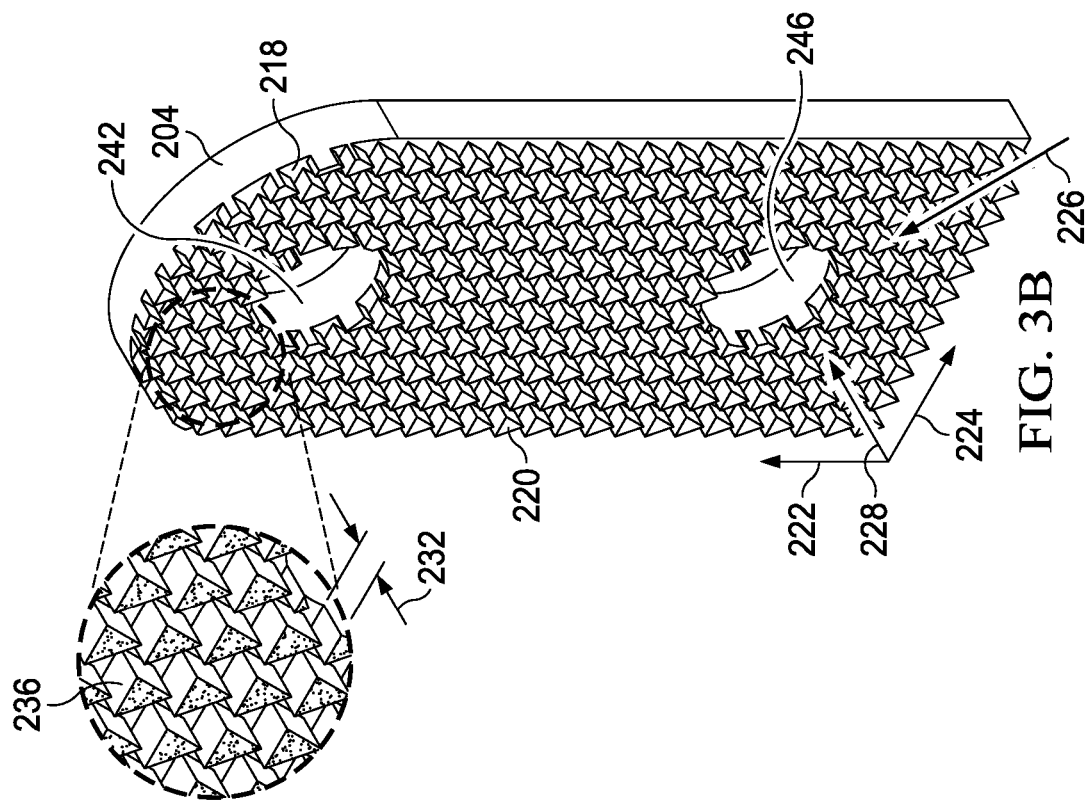
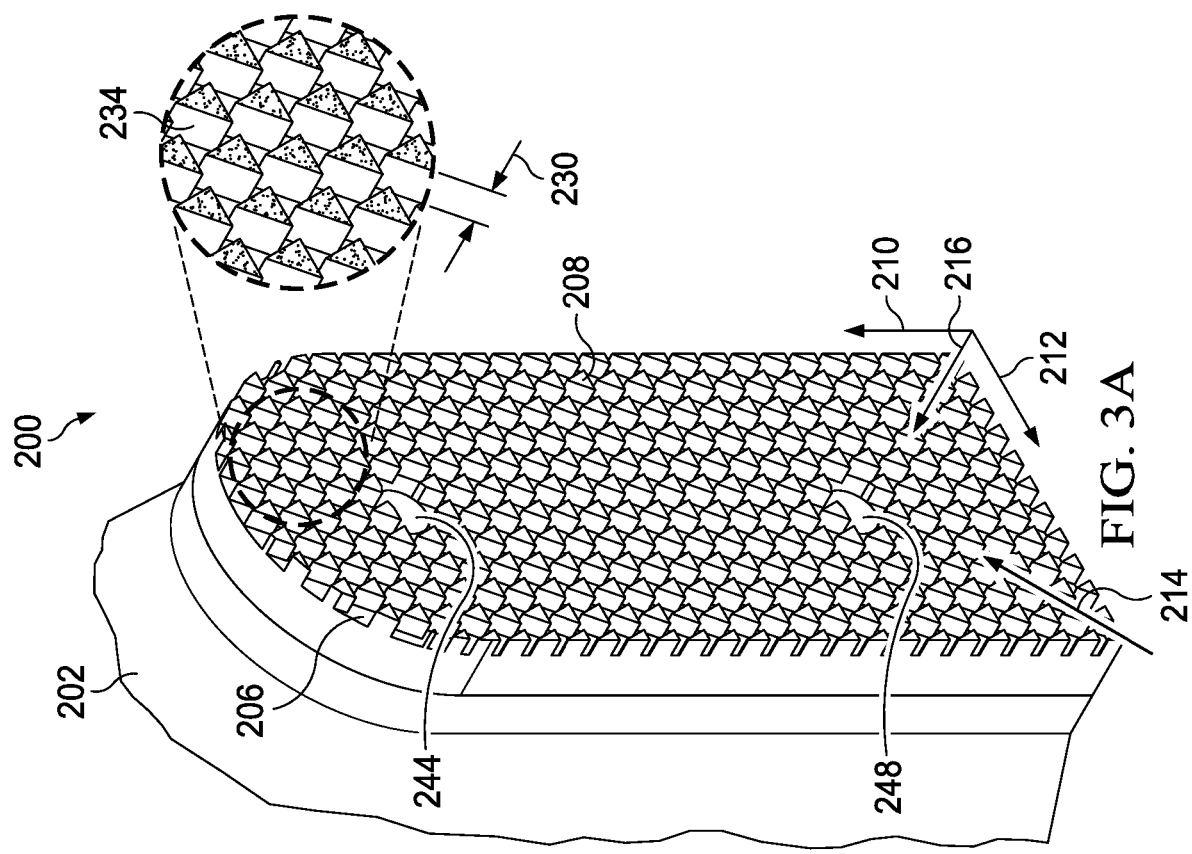
FIG. 3A
FIG. 3B

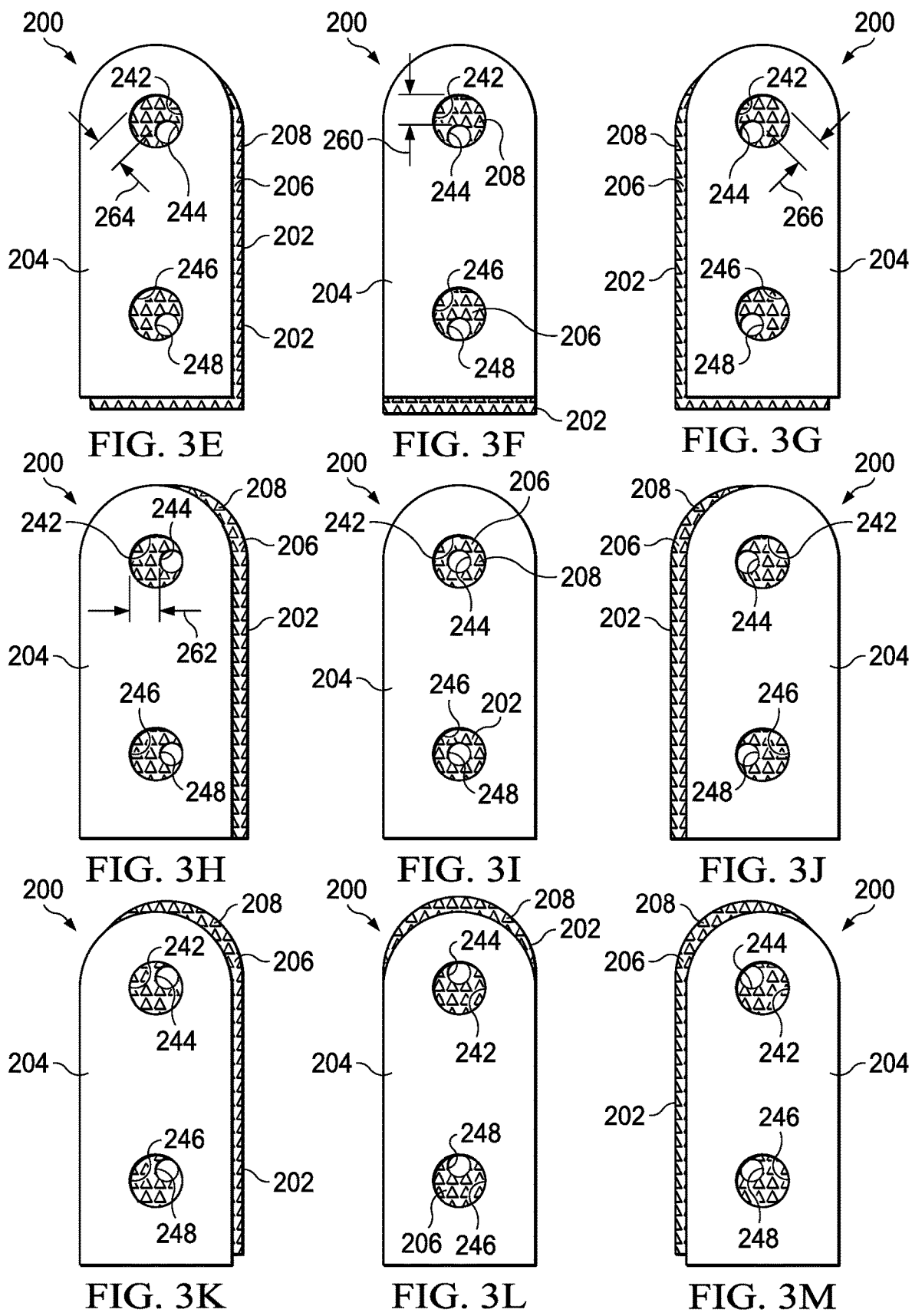

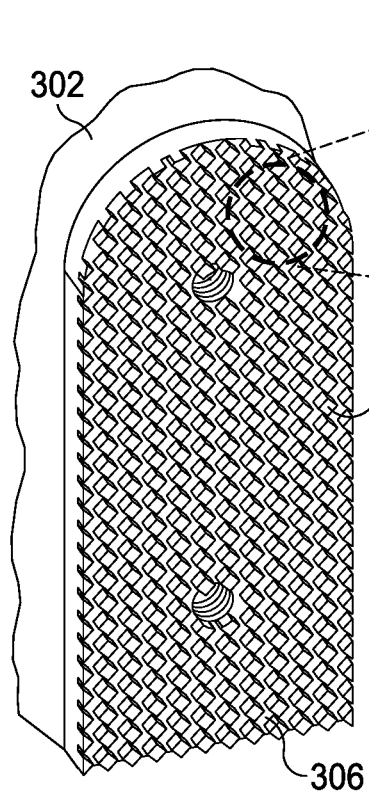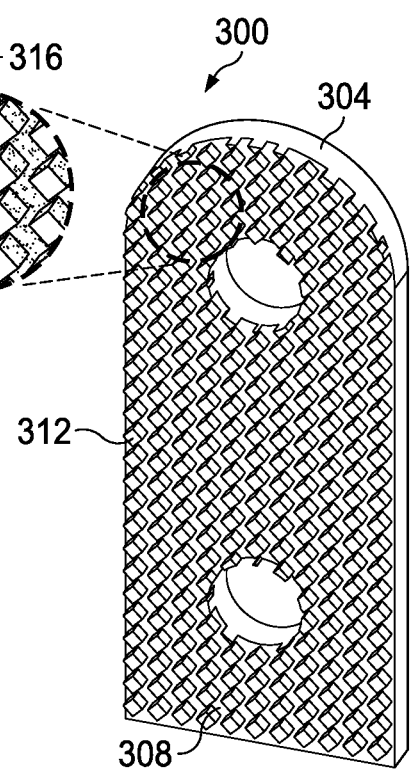
FIG. 4A  FIG. 4B
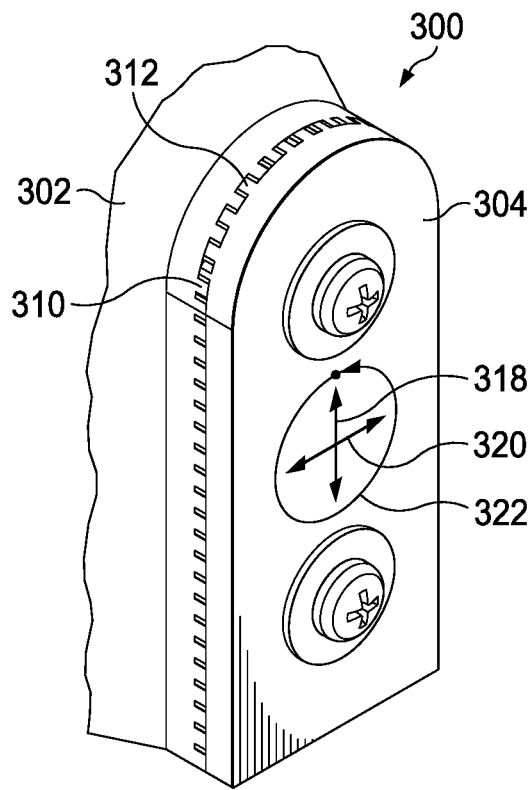
FIG. 4C

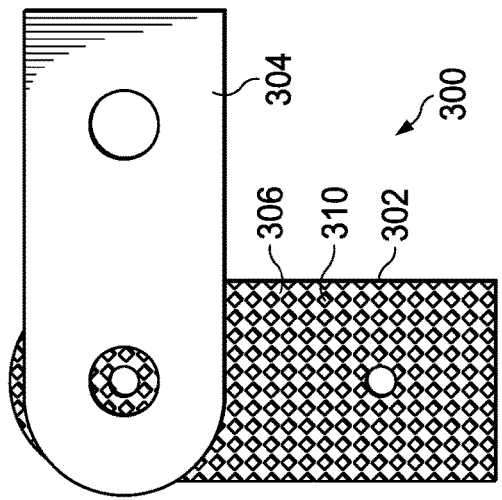
FIG. 4F
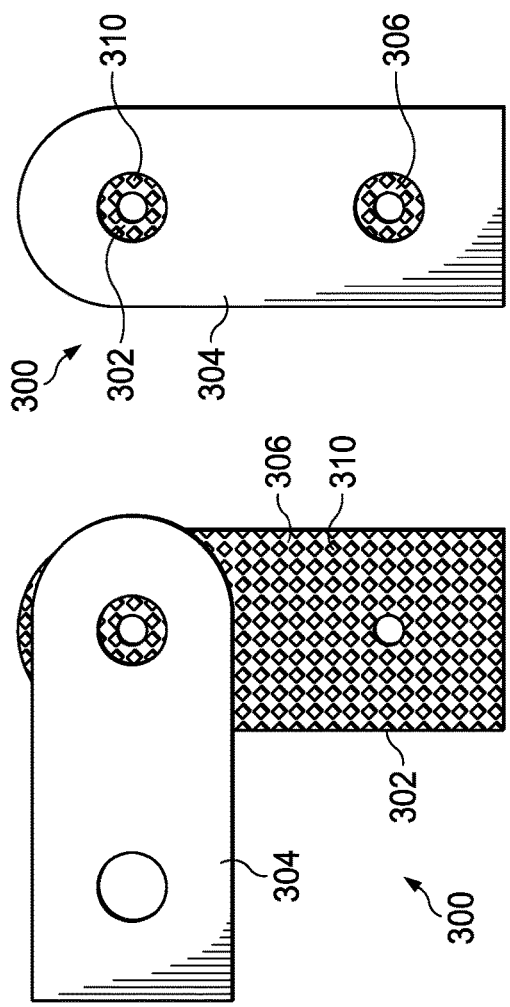
FIG. 4D
FIG. 4E
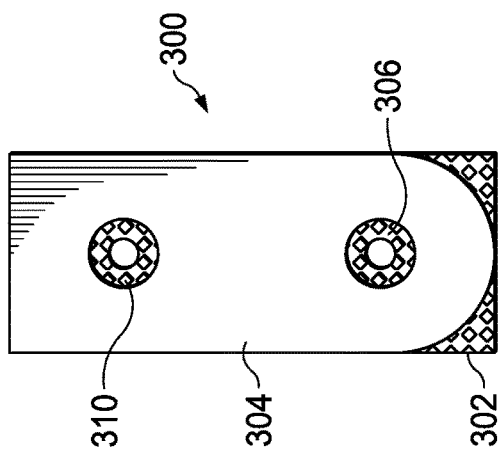
FIG. 4G

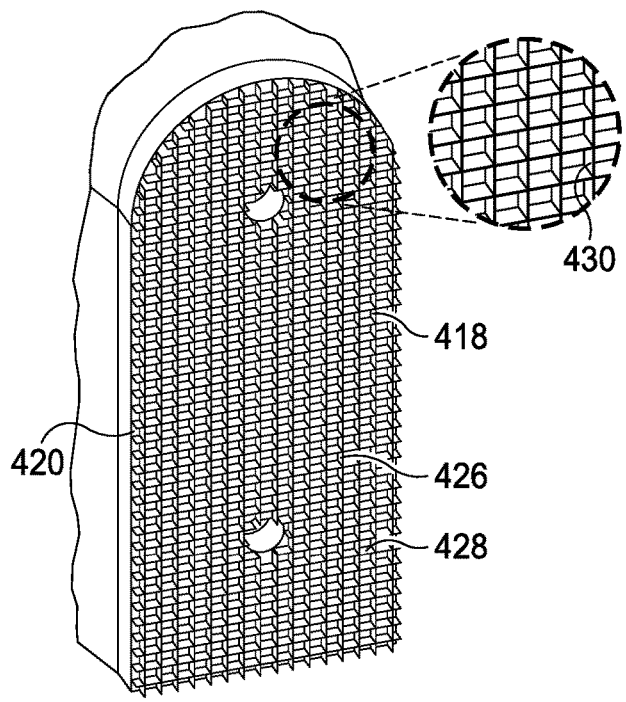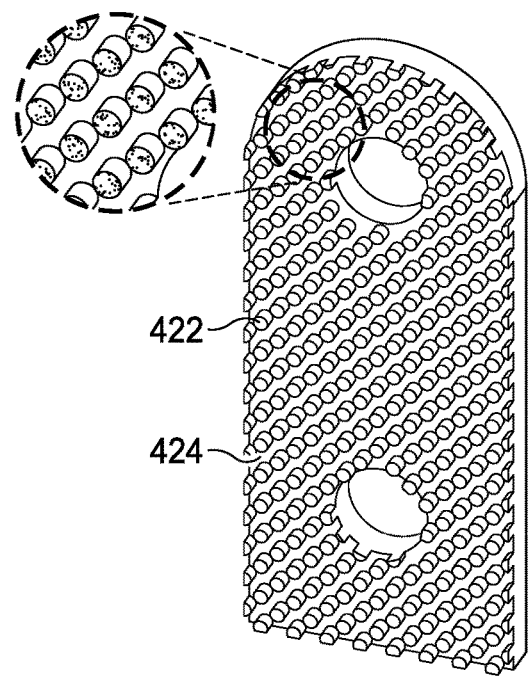
FIG. 5C
FIG. 5D
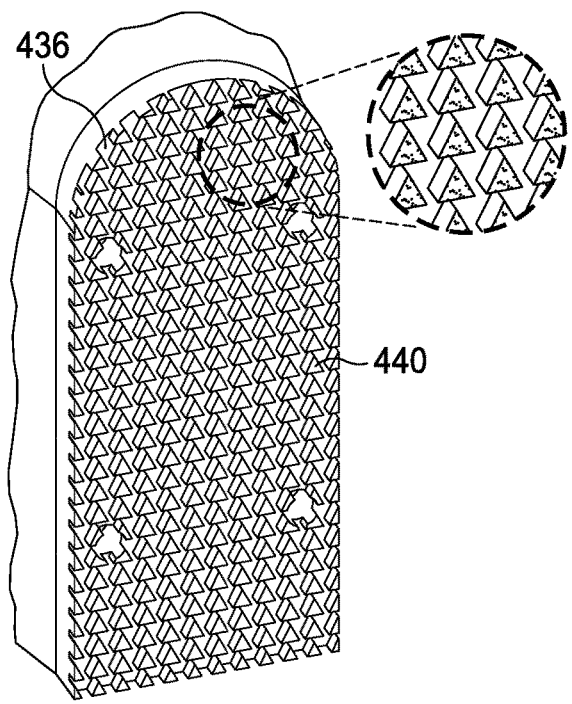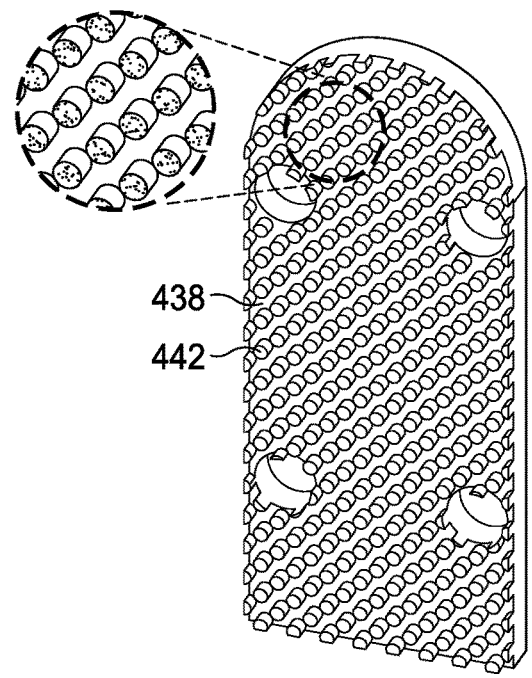
FIG. 5E
FIG. 5F

COMPONENT ALIGNMENT SYSTEMS FOR AIRCRAFT

TECHNICAL FIELD OF THE DISCLOSURE

The present disclosure relates, in general, to component alignment systems for use on aircraft and, in particular, to interlockable components each having a surface including shaped projections repeating in at least two directions along the component surface to enable translational adjustment of the two components relative to one another along at least two translational degrees of freedom.

BACKGROUND

The assembly of an aircraft refers to the joining of components or subassemblies by various means until the entire aircraft is in condition for operation. For example, aircraft are typically fabricated in a number of major subassemblies, such as the fuselage or main body, an empennage or tail section, wings, landing gear and an engine or power plant section. These subassemblies are then assembled to form the major structural or operational elements of the aircraft. Rigging is the positioning or alignment of aircraft components or subassemblies to obtain proper structural, flight and/or operational characteristics. A certain amount of rigging is typically necessary during the assembly of an aircraft, although certain rigging adjustments may still need to be made after assembly or to repair and maintain the aircraft.

During assembly, components are often fixedly and nonadjustably fastened to adjacent components, which increases the difficulty of rigging components relative to one another. For example, a component that has been fixedly attached during assembly is often deprived of the translational or rotational degrees of freedom necessary for rigging adjustments. In some cases, fixedly attached components may need to be structurally broken away or unwelded from adjacent components to obtain proper alignment with surrounding components, which increases the likelihood of needing to remanufacture, replace or modify one or more of the components. Certain aligning systems allow for onedimensional translational adjustments such as serrated plate components with serrations that extend in a single direction. A need has arisen, however, for a component aligning system that allows for two-dimensional translational adjustments and/or rotationally adjustments to facilitate the assembly of aircraft and reduce the time and cost of aircraft maintenance.

SUMMARY

In a first aspect, the present disclosure is directed to a component alignment system for an aircraft including a first component having a first surface including first shaped projections that repeat in at least two directions along the first surface. The component alignment system also includes a second component having a second surface including second shaped projections that repeat in at least two directions along the second surface. The first shaped projections are complementary to the second shaped projections such that the first surface is translationally and rotationally constrained relative to the second surface when the first and second shaped projections are in an interlocked position.

In some embodiments, the first surface may be interlockable with the second surface in quantized translational positions along at least two translational degrees of freedom. In such embodiments, the two translational degrees of freedom may be parallel to the first and second surfaces. In other embodiments, the quantized translational positions may be spaced apart by a translational distance proportional to a size of the shaped projections. In certain embodiments, the first surface may be interlockable with the second surface in at least one quantized rotational position along a rotational degree of freedom. In such embodiments, the rotational degree of freedom may be parallel to the first and second surfaces. In other embodiments, the first surface may be interlockable with the second surface in orthogonal rotational positions along the rotational degree of freedom. In certain embodiments, the first surface may be noninterlockable with the second surface in nonorthogonal rotational positions along the rotational degree of freedom. In some embodiments, the orthogonal rotational positions may include first and second orthogonal rotational positions spaced 180 degrees apart. In certain embodiments, the first surface may be interlockable with the second surface in a single rotational position.

In some embodiments, the first shaped projections may have a different cross-sectional shape than the second shaped projections. In certain embodiments, the first shaped projections may each have an inverted cross-sectional shape relative to the cross-sectional shape of the second shaped projections. In some embodiments, the first and second shaped projections may each have a polygonal cross-sectional shape such as a square, a triangular or a hexagonal cross-sectional shape. In certain embodiments, the first shaped projections may include cylindrical projections. In some embodiments, the first shaped projections may include walls to form receiving sockets. In such embodiments, the walls may include walls extending along a first direction and walls extending along a second direction orthogonal to the first direction to form square receiving sockets. In other embodiments, either or both of the first or second shaped projections may be tapered projections.

In certain embodiments, the first shaped projections may repeat in first and second directions along the first surface and the second shaped projections may repeat in third and fourth directions along the second surface. In such embodiments, the first surface may have a nonuniform depth along the first and second directions and the second surface may have a nonuniform depth along the third and fourth directions. In some embodiments, the first and second directions may be orthogonal and the third and fourth directions may be orthogonal. In certain embodiments, the first surface may form a first fastener hole, the second surface may form a second fastener hole and the first and second fastener holes may be configured to receive a fastener to secure the first surface against the second surface. In such embodiments, the second fastener hole may be larger than the first fastener hole such that the fastener is undersized relative to the second fastener hole, thereby allowing for translational adjustment between the first and second components. In certain embodiments, the first fastener hole may be threaded.

In a second aspect, the present disclosure is directed to a component alignment system for an aircraft including a first component having a first surface including first shaped projections each having a triangle cross-sectional shape and repeating in at least two directions along the first surface. The component alignment system also includes a second component having a second surface including second shaped projections each having an inverted triangle cross-sectional shape and repeating in at least two directions along the second surface. The first shaped projections are complementary to the second shaped projections such that the first surface is translationally and rotationally constrained relative to the second surface when the first and second shaped projections are in an interlocked position. The first surface is interlockable with the second surface in quantized translational positions along at least two translational degrees of freedom and the first surface is interlockable with the second surface in a single rotational position.

In some embodiments, the first surface may be noninterlockable with the second surface in rotational positions other than the single rotational position. In certain embodiments, the aircraft may include a bay door and the first or second component may be a bay door switch. In some embodiments, a portion of the shaped projections may include at least three projection interface surfaces each configured to engage a respective adjacent shaped projection in the interlocked position.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3M are various views a component alignment system having triangular shaped projections in accordance with embodiments of the present disclosure;

FIGS. 4A-4G are various views of a component alignment system having square shaped projections in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
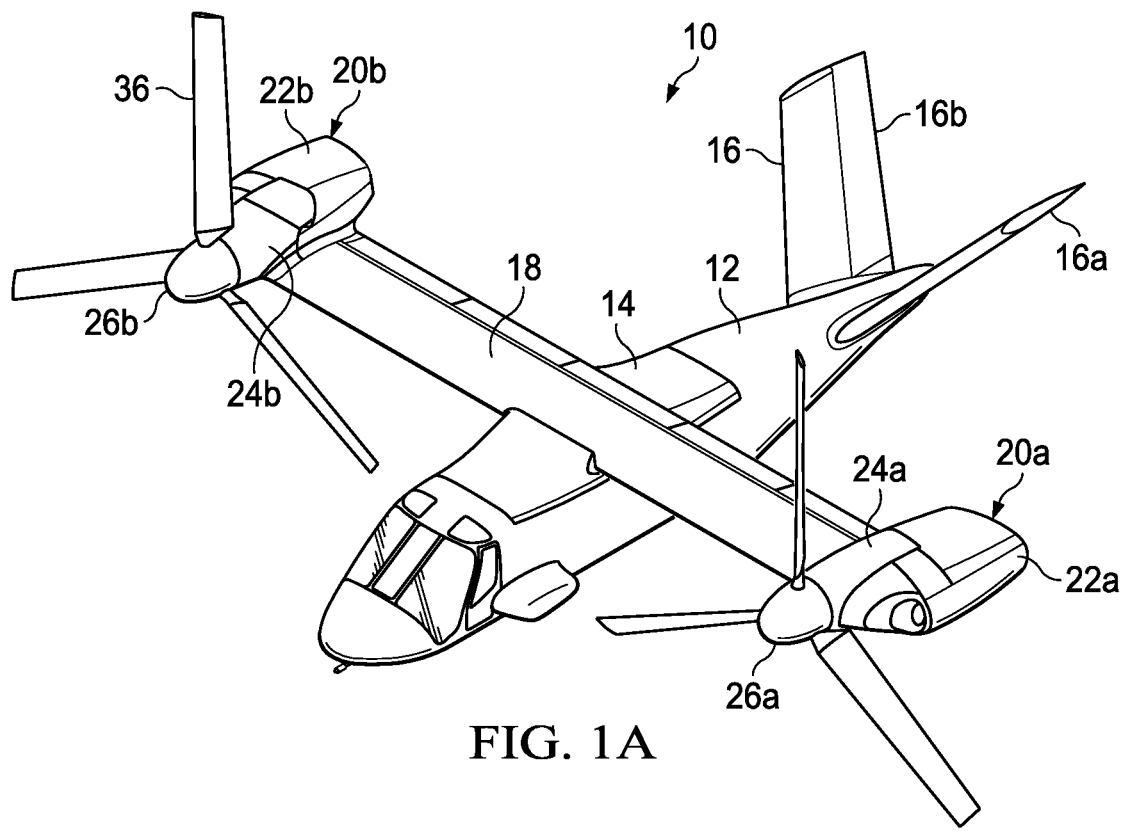
FIGS. 1A-1E are schematic illustrations of a rotorcraft including a component alignment system in accordance with embodiments of the present disclosure.
Figure 1B:
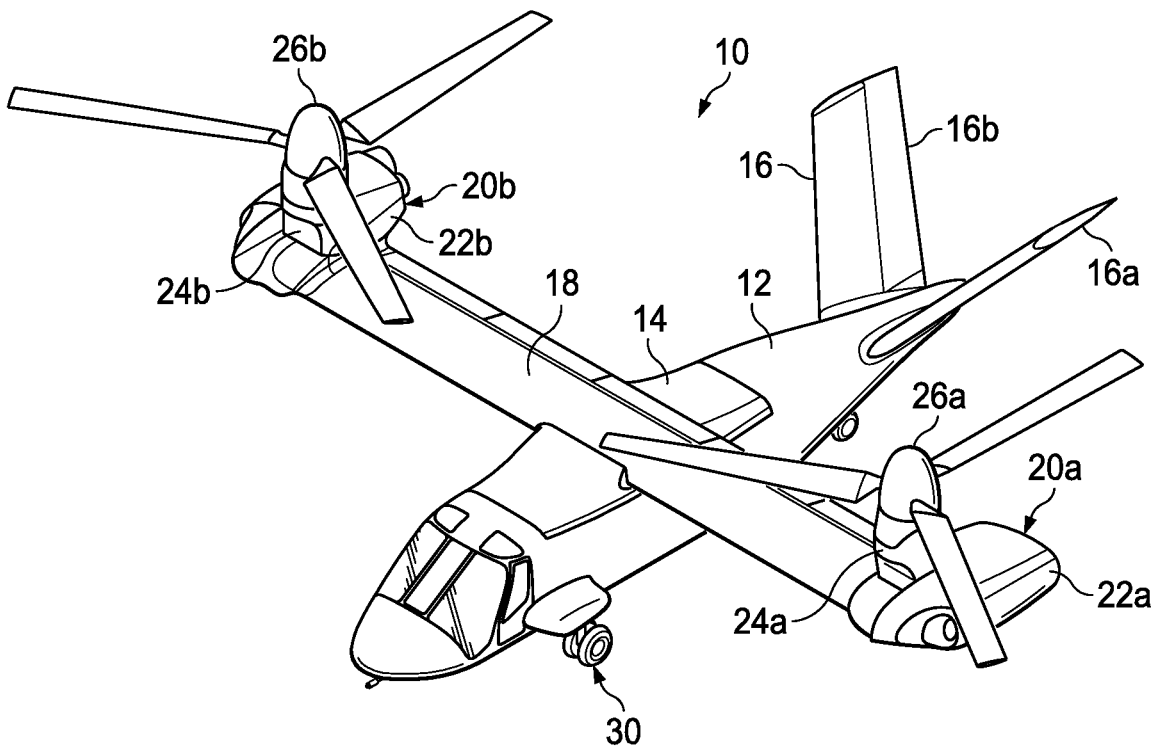
Figure 1C:
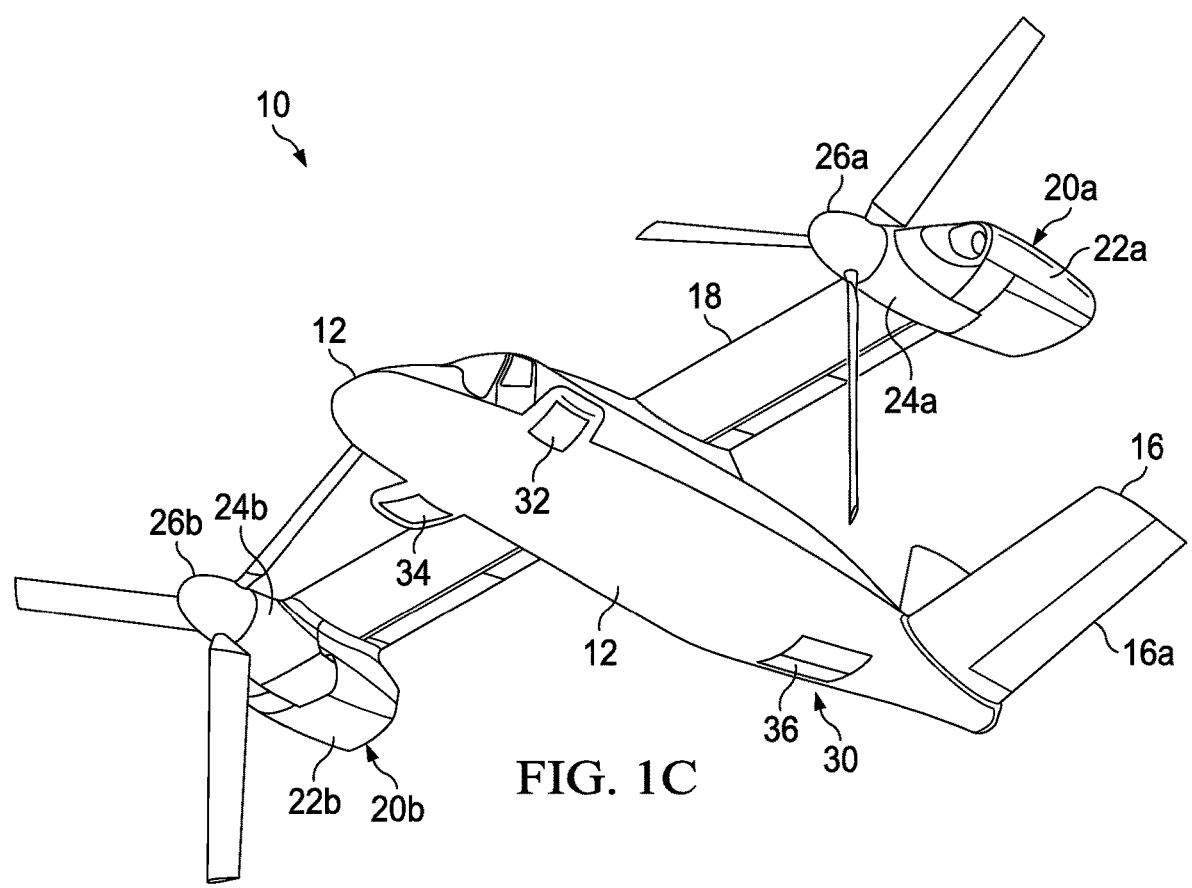

Referring to FIGS. 1A-1E in the drawings, a tiltrotor aircraft is schematically illustrated and generally designated 10. Tiltrotor aircraft 10 includes a fuselage 12, a wing mount assembly 14 and a tail assembly 16 including rotatably mounted tail members 16a, 16b having control surfaces operable for horizontal and/or vertical stabilization during forward flight. A wing member 18 is supported by wing mount assembly 14. Coupled to outboard ends of wing member 18 are propulsion assemblies 20a, 20b. Propulsion assembly 20a includes a nacelle depicted as fixed pylon 22a that houses an engine and a transmission. Thus, the nacelle is fixed relative to wing member 18. In addition, propulsion assembly 20a includes a mast assembly 24a having a mast that is rotatable relative to fixed pylon 22a, wing member 18 and fuselage 12 between a generally horizontal orientation, as best seen in FIGS. 1A and 1C, and a generally vertical orientation, as best seen in FIG. 1B. Propulsion assembly 20a also includes a proprotor assembly 26a, including proprotor blade assemblies radiating therefrom, which is rotatable responsive to torque and rotational energy provided via a rotor hub assembly and drive system mechanically coupled to the engine and transmission housed by fixed pylon 22a. Similarly, propulsion assembly 20b includes a nacelle depicted as fixed pylon 22b that houses an engine and transmission and a mast assembly 24b that is rotatable relative to fixed pylon 22b, wing member 18 and fuselage 12. Propulsion assembly 20b also includes a proprotor assembly 26b, including proprotor blade assemblies radiating therefrom, which is rotatable responsive to torque and rotational energy provided via a rotor hub assembly and drive system mechanically coupled to the engine and transmission housed by fixed pylon 22b.

FIGS. 1A and 1C illustrate tiltrotor aircraft 10 in airplane or forward flight mode, in which proprotor assemblies 26a, 26b are rotating in a substantially vertical plane to provide a forward thrust enabling wing member 18 to provide a lifting force responsive to forward airspeed, such that tiltrotor aircraft 10 flies much like a conventional propeller driven aircraft. FIG. 1B illustrates tiltrotor aircraft 10 in helicopter or vertical takeoff and landing (VTOL) flight mode, in which proprotor assemblies 26a, 26b are rotating in a substantially horizontal plane to provide a lifting thrust, such that tiltrotor aircraft 10 flies much like a conventional helicopter. It should be appreciated that tiltrotor aircraft 10 can be operated such that proprotor assemblies 26a, 26b are selectively positioned between forward flight mode and VTOL flight mode, which can be referred to as a conversion flight mode. Even though tiltrotor aircraft 10 has been described as having one engine in each fixed pylon 22a, 22b, it should be understood by those having ordinary skill in the art that other engine arrangements are possible and are considered to be within the scope of the present disclosure including, for example, having a single engine which may be housed within fuselage 12 that provides torque and rotational energy to both proprotor assemblies 26a, 26b.

Figure 1D:
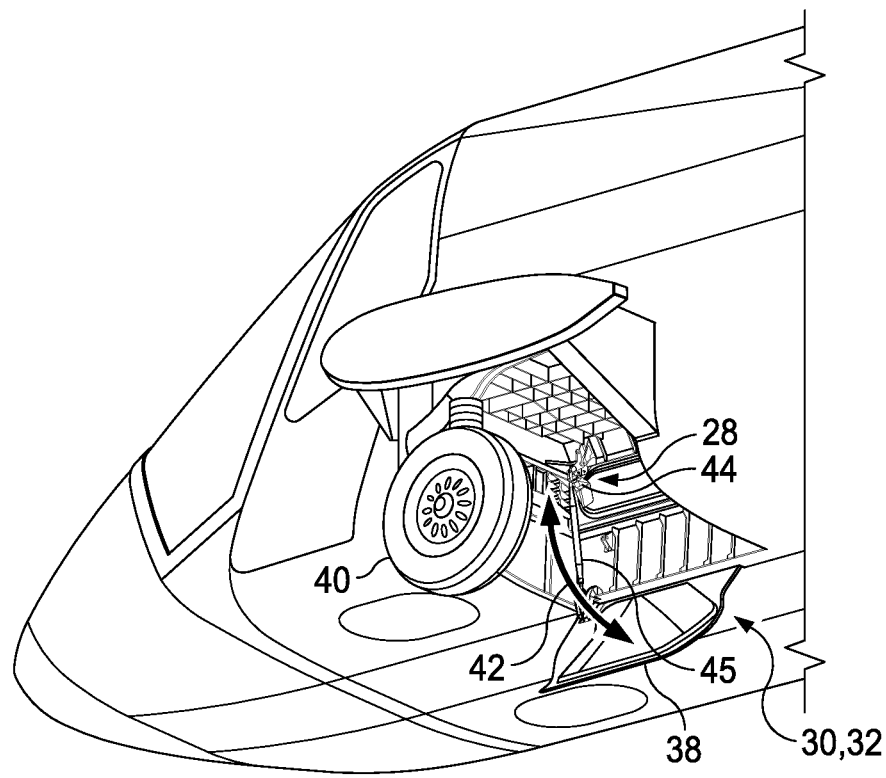
Figure 1E:
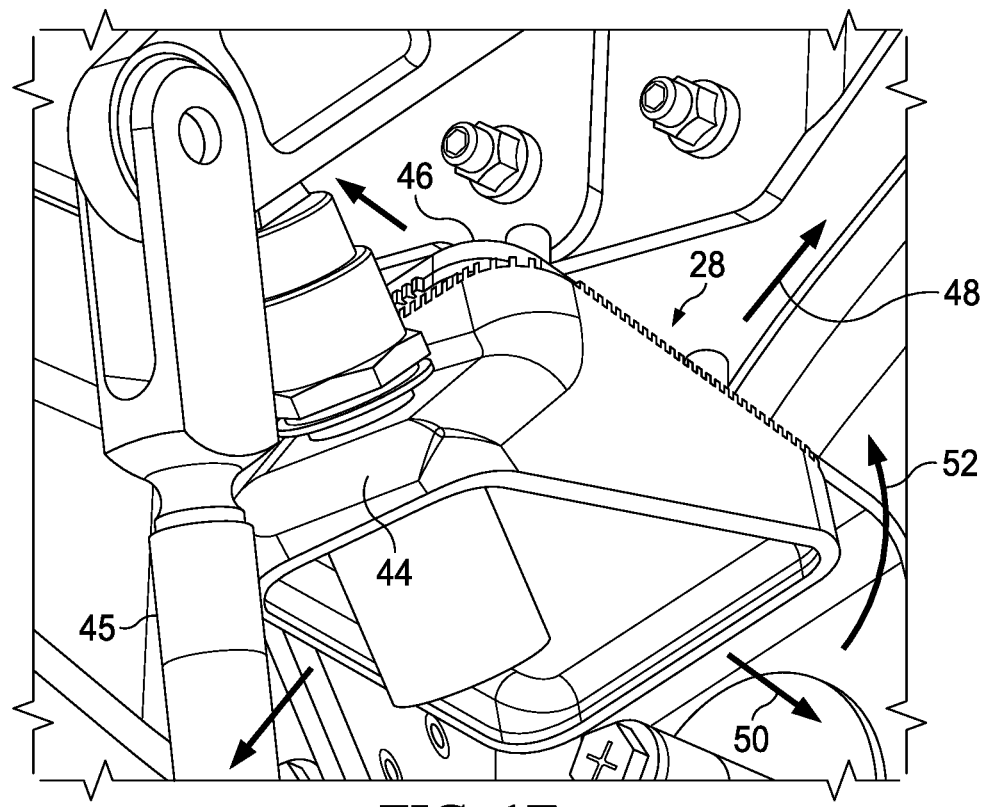

Tiltrotor aircraft 10 includes one or more component alignment systems 28 to aid in the assembly or maintenance of tiltrotor aircraft 10. Component alignment system 28 allows for rigging adjustment along two translational degrees of freedom when securing one component to another. Landing gear system 30 of tiltrotor aircraft 10, best seen in FIGS. 1C-1E, provides a non-limiting example of an aircraft subsystem on which component alignment system 28 may be utilized. Landing gear system 30 includes forward landing wheel bays 32, 34 and aft landing wheel bay 36. With reference to FIGS. 1D-1E, forward landing wheel bay 32 includes a bay door 38 and a landing wheel assembly 40. Bay door 38 is retractable along motion arrow 42. Forward landing wheel bay 32 includes a bay door switch 44 that, when engaged by linkage 45, generates a signal indicating that forward landing wheel bay 32 is in the extended or open position. In the illustrated embodiment, bay door switch 44 is mounted onto a switch mount 46 after forward landing wheel bay 32 has been assembled so that bay door switch 44 may be rigged to ensure proper engagement between linkage 45 and bay door switch 44 when forward landing wheel bay 32 is extended.

Component alignment system 28 allows bay door switch 44 to be adjusted relative to switch mount 46 along translational degrees of freedom 48, 50 so that bay door switch 44 may be secured to switch mount 46 at a location that ensures engagement between bay door switch 44 and linkage 45. Component alignment system 28 may, for example, securely position bay door switch 44 at a quantum translational granularity as low as 0.01 inches if necessary to ensure proper engagement between bay door switch 44 and linkage 45. The precision or granularity at which a component may be aligned using component alignment system 28 may vary depending on the particular application. In some embodiments, bay door switch 44 may be rotatably adjusted relative to switch mount 46 along rotational degree of freedom 52 if required to ensure proper engagement between bay door switch 44 and linkage 45. In yet other embodiments, components other than bay door switch 44 may be mounted onto switch mount 46 to enable alternative or additional functionality for forward landing wheel bay 32. It will be appreciated by one of ordinary skill in the art that component alignment system 28 may be used anywhere on tiltrotor aircraft 10 such as fuselage 12, wing member 18 and/or propulsion assemblies 20a, 20b.

It should be appreciated that tiltrotor aircraft 10 is merely illustrative of a variety of aircraft that can implement the embodiments disclosed herein. Indeed, component alignment system 28 may be implemented on any aircraft. Other aircraft implementations can include hybrid aircraft, tiltwing aircraft, quad tiltrotor aircraft, unmanned aircraft, gyrocopters, propeller-driven airplanes, compound helicopters, drones, jets, helicopters and the like. As such, those skilled in the art will recognize that component alignment system 28 can be integrated into a variety of aircraft configurations. It should be appreciated that even though aircraft are particularly well-suited to implement the embodiments of the present disclosure, non-aircraft vehicles and devices can also implement the embodiments.

Figure 2:
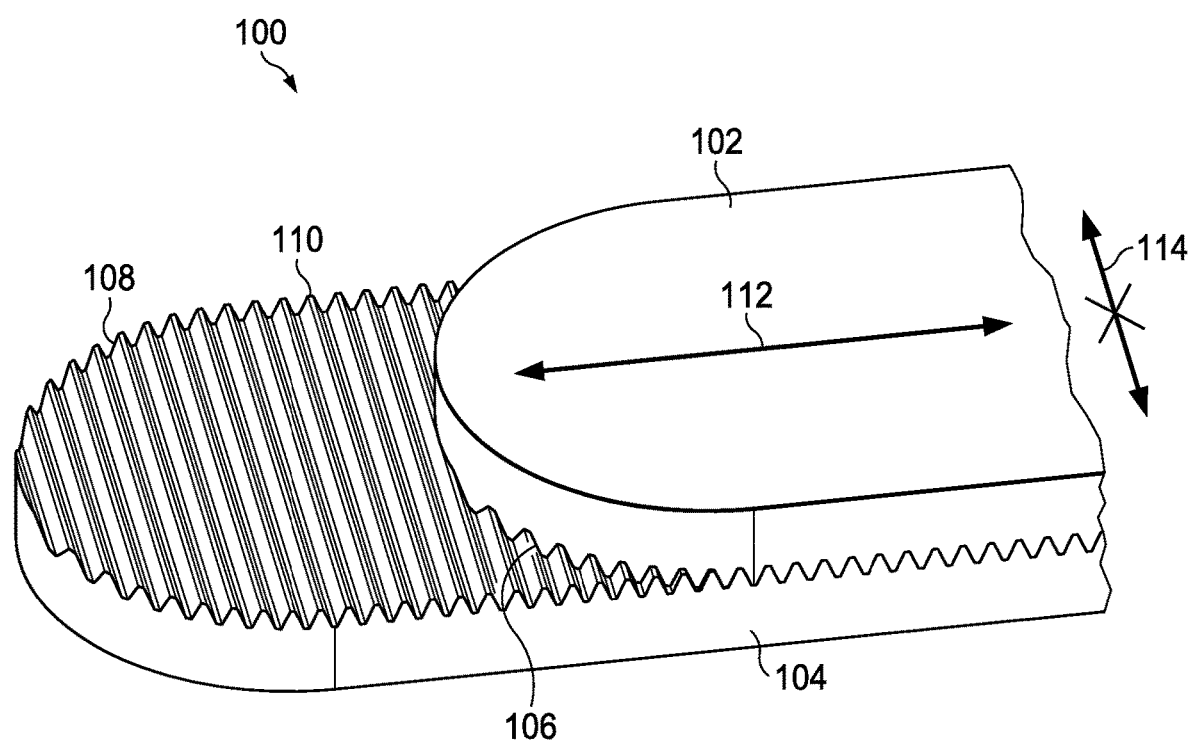
FIG. 2 is an isometric view of two components having serrated surfaces for adjustment along a single translational degree of freedom.

Referring to FIG. 2 in the drawings, the current system for aligning components is schematically illustrated and generally designated 100. System 100 includes components 102, 104 having serrated surfaces 106, 108, respectively. Each ridge 110 repeats along serrated surfaces 106, 108 in only a single direction 112. Thus, components 102, 104 may be interlockably aligned relative to one another along only a single translational degree of freedom parallel to direction 112. Conversely, components 102, 104 cannot be interlockably aligned relative to one another along orthogonal translational degree of freedom 114, thereby limiting the usefulness of system 100 in aligning either or both components 102, 104 relative to other components on an aircraft.

Referring to FIGS. 3A-3M in the drawings, a component alignment system is schematically illustrated and generally designated 200. Component alignment system 200 translationally and rotationally aligns component 202 relative to component 204 so that either component 202, 204 may be rigged during or after assembly of the system of which components 202, 204 are a part. Surface 206 of component 202 includes shaped projections, or studs, 208. Shaped projections 208 repeat in a vertical direction 210 and a horizontal direction 212. Vertical direction 210 is orthogonal to horizontal direction 212. In the illustrated embodiment, vertical direction 210 is parallel to the side edges of component 202 and horizontal direction 212 is parallel to the bottom edge of component 202. Shaped projections 208 also repeat in diagonal directions 214, 216. Diagonal directions 214, 216 each form an angle of about 45 degrees with vertical direction 210 and horizontal direction 212, although in other embodiments diagonal directions 214, 216 may form any angle with a vertical or horizontal reference axis. Surface 218 of component 204 includes shaped projections 220. Shaped projections 220 repeat in a vertical direction 222 and a horizontal direction 224. In the illustrated embodiment, vertical direction 222 is parallel to the side edges of component 204 and horizontal direction 224 is parallel to the bottom edge of component 204. Shaped projections 220 also repeat in diagonal directions 226, 228. Diagonal directions 226, 228 each form an angle of about 45 degrees with vertical direction 222 and horizontal direction 224, although in other embodiments diagonal directions 226, 228 may form any angle with a vertical or horizontal reference axis.

Because shaped projections 208, 220 repeat in several directions along surfaces 206, 218, the depths of surfaces 206, 218 are also nonuniform in these directions. In particular, the depth of surface 206 along directions 210, 212, 214, 216 is nonuniform, ranging from zero to depth 230 of shaped projections 208. Also, the depth of surface 218 along directions 222, 224, 226, 228 is nonuniform, ranging from zero to depth 232 of shaped projections 220. It will be appreciated by one of ordinary skill in the art that depths 230, 232 of shaped projections 208, 220 may vary depending on the embodiment and that depths 230, 232 themselves may be uniform or nonuniform.

Shaped projections 220 have an inverted shape relative to the shape of shaped projections 208 so that shaped projections 208 are complementary to and interlockable with shaped projections 220. More particularly, shaped projections 208 have a triangle cross-sectional shape and shaped projections 220 have an inverted triangle cross-sectional shape. Shaped projections 208 and/or shaped projections 220 may have polygonal cross-sectional shapes other than a triangle such as a square, rectangle, pentagon or hexagon as well as others. In some embodiments, a triangle may be selected as the cross-sectional shape for shaped projections 208, 220 to provide larger interface surfaces 234, 236 at which shaped projections 208 contact shaped projections 220 when components 202, 204 are interlocked. Because shaped projections 208, 220 have triangle cross-sectional shapes, each shaped projection 208, 220 has three interface surfaces 234, 236. The number of interface surfaces of each shaped projection depends on the cross-sectional shape of the shaped projections. Shaped projections 208, 220, as well as components 202, 204 and surfaces 206, 218, may be formed using any additive, subtractive or formative manufacturing technique such as extrusion, casting, molding, stamping or 3D printing as well as others.

Figure 3C:
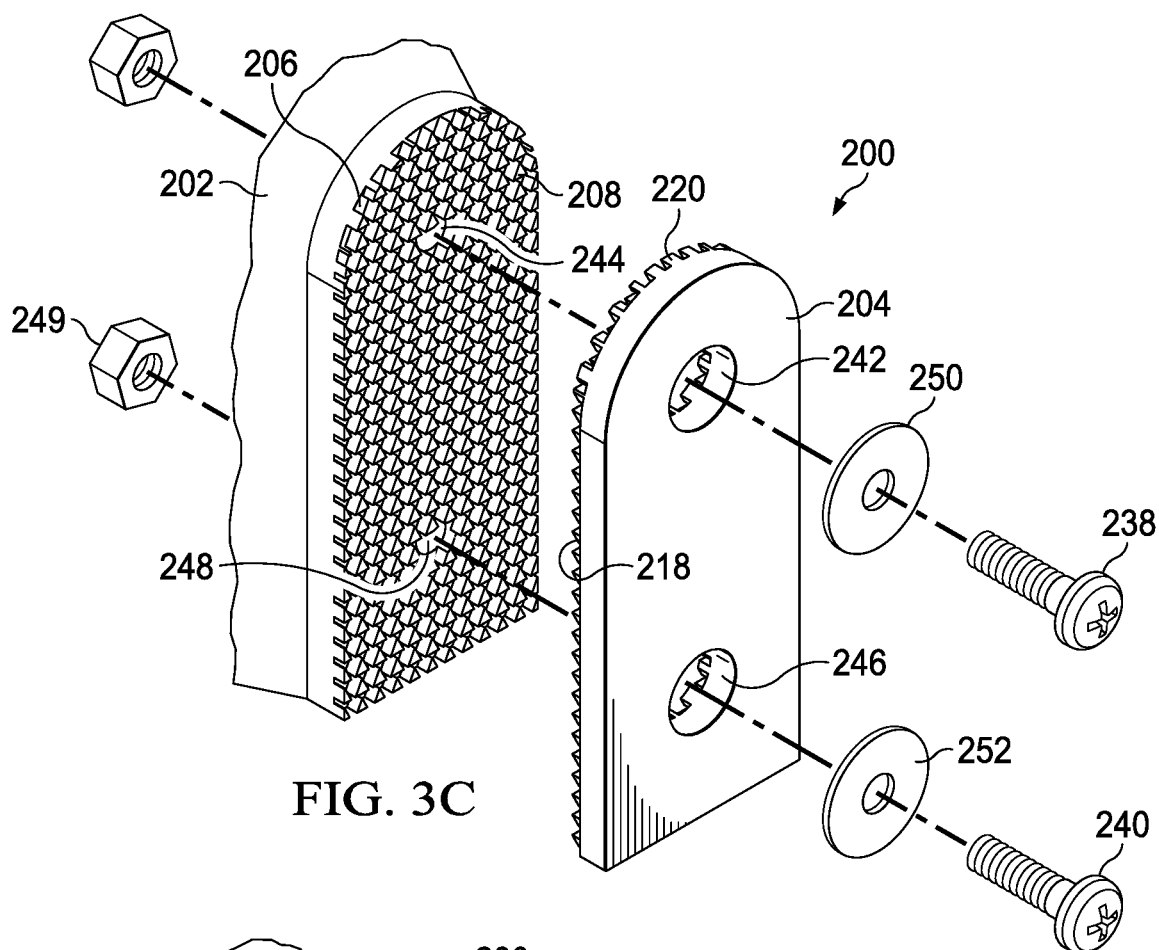

In FIGS. 3A-3B, shaped projections 208, 220 are in a noninterlocked position. Component 204 is moved toward an interlocked position with component 202 by positioning surfaces 206 and 218 parallel to one another as shown in FIG. 3C. Surface 218 may be secured or clamped against surface 206 using fasteners 238, 240, which are bolts in the illustrated embodiment. Fastener 238 may be inserted through fastener hole 242 formed by component 204 and fastener hole 244 formed by component 202. Likewise, fastener 240 may be inserted through fastener hole 246 formed by component 204 and fastener hole 248 formed by component 202. Fasteners 238, 240 may be secured by nuts 249 to clamp surfaces 206, 218 against one another. Fastener holes 242, 246 are larger, or oversized, relative to fastener holes 244, 248 to allow for the translational adjustment of component 204 relative to component 202. Depending on the diameters of fastener holes 242, 246, washers 250, 252 may optionally be used to cover fastener holes 242, 246. It will be appreciated by one of ordinary skill in the art that components 202, 204 may each form any number of threaded or unthreaded fastener holes. Fasteners 238, 240 may be other fastener types in other embodiments such as screws, unthreaded bolts or pins. In yet other embodiments, component 204 may be secured to component 202 in the out-of-plane direction using a clamp or other coupling technique.

Figure 3D:
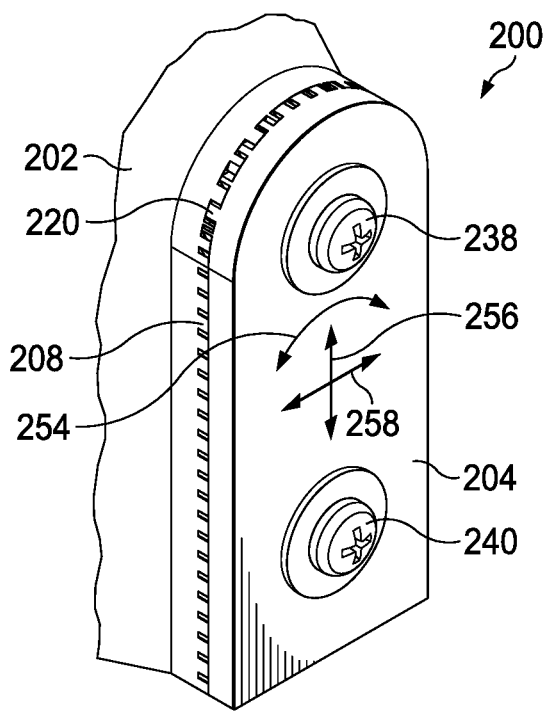

In FIG. 3D, fasteners 238, 240 have been used to tighten surface 218 against surface 206 so that shaped projections 208, 220 are in the interlocked position. In the interlocked position, surface 218 of component 204 is translationally and rotationally constrained relative to surface 206 of component 202. Also in the interlocked position, most or all interface surfaces 234 of shaped projections 208 engage a respective and adjacent shaped projection 220. Likewise, most or all interface surfaces 236 of shaped projections 220 engage a respective and adjacent shaped projection 208. The engagement of interface surfaces 234, 236 with one another and the intermeshing of shaped projections 208, 220 provide a load transfer path between component 202 and component 204. Because shaped projections 208, 220 are shaped as complementary upright and inverted triangles, surface 218 is limited to interlocking with surface 206 in just a single rotational position as shown in FIG. 3D. In the illustrated embodiment, surface 218 is noninterlockable with surface 206 in rotational positions other than the single rotational position shown in FIG. 3D. Thus, when components 202, 204 are not interlocked, component 204 cannot be rotated relative to component 202 along rotation direction 254 and subsequently interlocked unless component 204 is rotated to the position shown in FIG. 3D. By limiting interlocked components 202, 204 to a single rotational position, certain benefits may be achieved. For example, placement of component 204 relative to component 202 may be less complex and reduce assembly mistakes. Such a limit on the rotational position may also ensure a proper alignment between component 202, component 204 and components adjacent to components 202, 204.

In contrast, component 204 is interlockable with component 202 in many different translational positions along translational degrees of freedom 256, 258, which are parallel to surfaces 206, 218. In particular, the tightly interlocking pattern of shaped projections 208, 220 mesh or interlock in multiple quantized translational positions exemplified in FIGS. 3E-3M. The quantized translational positions are spaced apart by a translational distance that is proportional to the size of shaped projections 208, 220. The larger the size of shaped projections 208, 220, the larger the translational distance between each quantized translational position. The translational distance between the quantized translational positions may also be proportional to the spacing between shaped projections 208 and/or the spacing between shaped projections 220. As shown in FIGS. 3F, 3I and 3L, component 204 is translatable and interlockable with component 202 in a number a vertical quantized translational positions. The distance between the vertical quantized translational positions may be determined by the height of shaped projections 208, 220, the vertical spacing between shaped projections 208, 220 or other factors. As shown in FIGS. 3H, 3I and 3J, component 204 is translatable and interlockable with component 202 in a number of horizontal quantized translational positions. The distance between the horizontal quantized translational positions may be determined by the width of shaped projections 208, 220, the horizontal spacing between shaped projections 208, 220 or other factors. As shown in FIGS. 3I, 3E, 3G, 3K and 3M, component 204 is translatable and interlockable with component 202 in a number of diagonal quantized translational positions. The distance between the diagonal quantized translational positions may be determined by the diagonal length of shaped projections 208, 220, the spacing between shaped projections 208, 220, the shape of shaped projections 208, 220 or other factors.

The distance across which component 204 may be moved vertically, horizontally or diagonally relative to component 202 while still being able to make use of fasteners 238, 240 is determined by the sizes of holes 242, 244, 246, 248. Because fastener holes 242, 246 are larger than fastener holes 244, 248, component 204 may be translated and interlocked relative to component 202 as shown in FIGS. 3E-3M while still allowing fasteners 238, 240 to penetrate hole set 242, 244 and hole set 246, 248, respectively. As component 204 is translationally shifted relative to component 202, fastener holes 244, 248 may have a nonconcentric relationship with fastener holes 242, 246, respectively, as shown in FIGS. 3E-3H and 3J-3M. Oversizing fastener holes 242, 246 permits component 204 to be translated by vertical distance 260, horizontal distance 262 and diagonal distances 264, 266. To continue the non-limiting example illustrated in FIGS. 1D-1E, a bay door switch may need to be adjustably translated within about 0.06 inches after a forward landing wheel bay has been built to ensure adequate contact between the bay door switch and a linkage. In this non-limiting example, fastener holes 242, 246 may have a diameter that is 0.12 inches larger than the diameter of fastener holes 244, 248 to achieve a 0.06 inch float. It will be appreciated by those of ordinary skill in the art, however, that the relative sizes of fastener holes 242, 246 and fastener holes 244, 248 may vary widely depending on the application.

Referring to FIGS. 4A-4G in the drawings, a component alignment system is schematically illustrated and generally designated 300. Component alignment system 300 includes components 302, 304. Surfaces 306, 308 of components 302, 304 include shaped projections 310, 312, respectively. Shaped projections 310, 312 have square cross-sectional shapes that are tilted to form diamonds. Each shaped projection 310 has four interface surfaces 314 and each shaped projection 312 has four interface surfaces 316. Interface surfaces 314, 316 of shaped projections 310, 312 contact one another when components 302, 304 are in the interlocked position shown in FIG. 4C. Similar to component alignment system 200 in FIGS. 3A-3M, component 304 may be translated relative to component 302 and subsequently interlocked with component 302 along translational degrees of freedom 318, 320. The quantized translational positions at which component 304 may be interlocked with component 302 are spaced apart by a translational distance that is proportional to the size, spacing and shape of shaped projections 310, 312.

Component 304 is interlockable with component 302 in four quantized rotational positions along rotational degree of freedom 322, which is parallel to surfaces 306, 308. As best seen in FIGS. 4D-4G, the four quantized rotational positions at which surface 308 is interlockable with surface 306 are orthogonal positions. In particular, component 304 may be rotationally positioned at a 0 degree, 90 degree, 180 degree and 270 degree rotational position relative to component 302 as shown in FIGS. 4D, 4E, 4G and 4F, respectively. Component 304 may be translated relative to component 302 while in any of these four quantized rotational positions. In FIGS. 4D-4G, one or both sets of fastener holes have been aligned to allow one or two fasteners to clamp component 304 to component 302, although in other embodiments the fastener holes need not be aligned. Components 302, 304 may be considered to be rotationally constrained to four orthogonal quantized rotational positions such that components 302, 304 are not interlockable in nonorthogonal rotational positions along rotational degree of freedom 322. For example, component 304 cannot be interlocked to component 302 if component 304 is tilted by 10 degrees and pressed against component 302. Allowing for multiple quantized rotational positions may be useful in aligning or positioning components 302, 304 for assembly purposes.

Figures 5A, 5B:
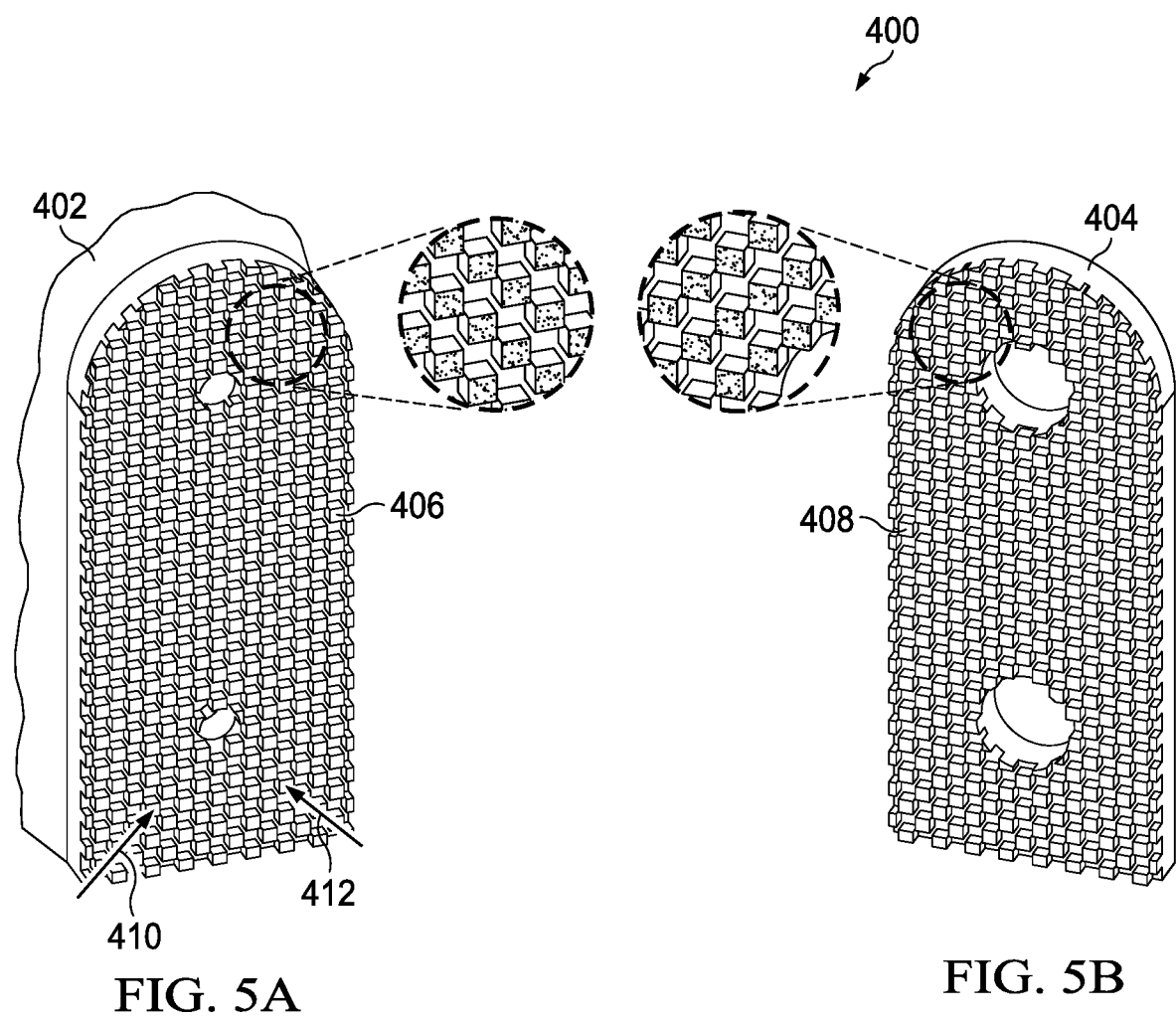
FIGS. 5A-5N are various views of different component alignment systems in accordance with embodiments of the present disclosure.
Figure 5G:
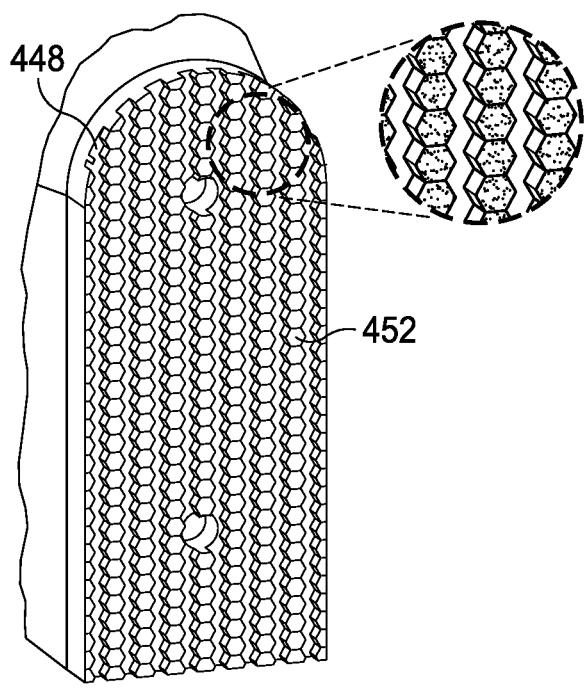
Figure 5H:
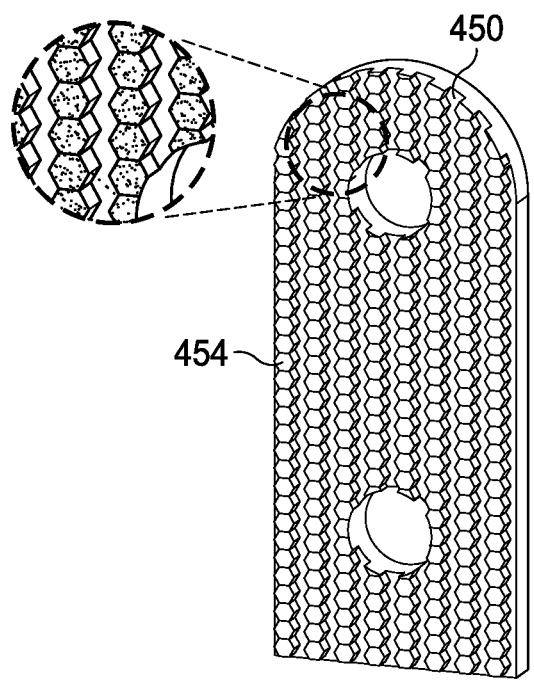
Figure 5I:
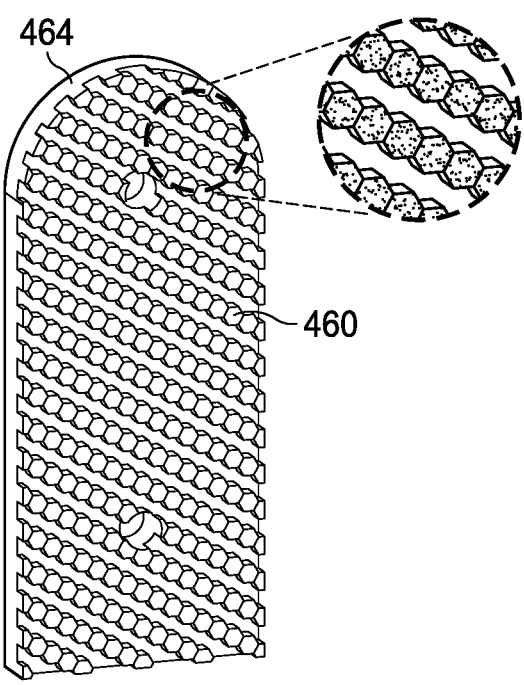
Figure 5J:
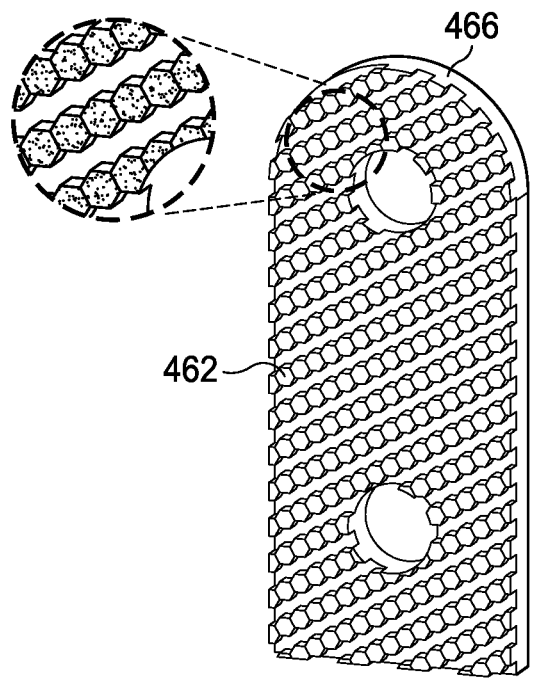
Figure 5K:
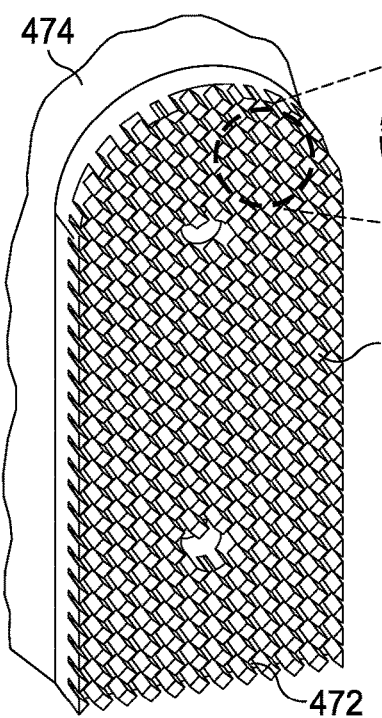
Figure 5L:
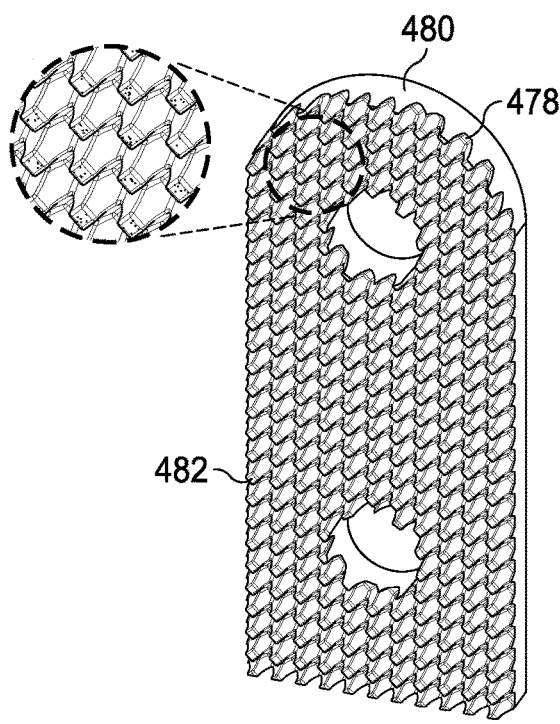
Figure 5M:
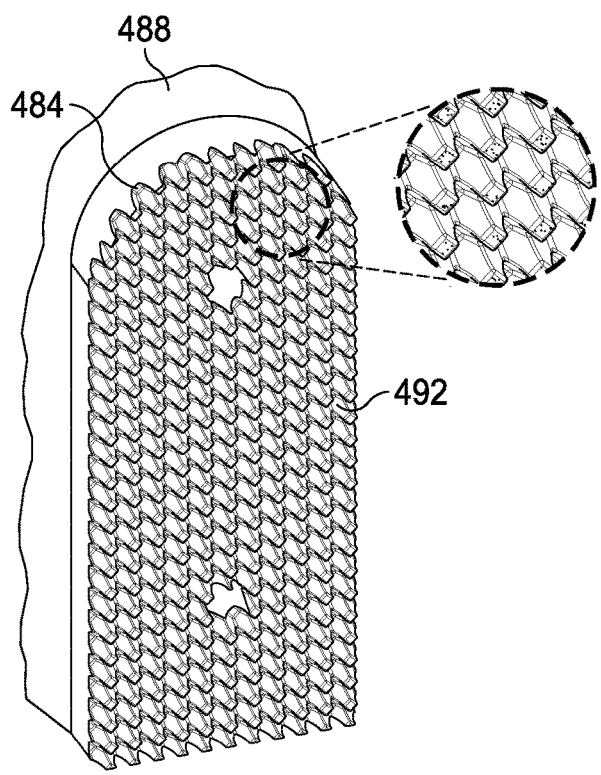
Figure 5N:
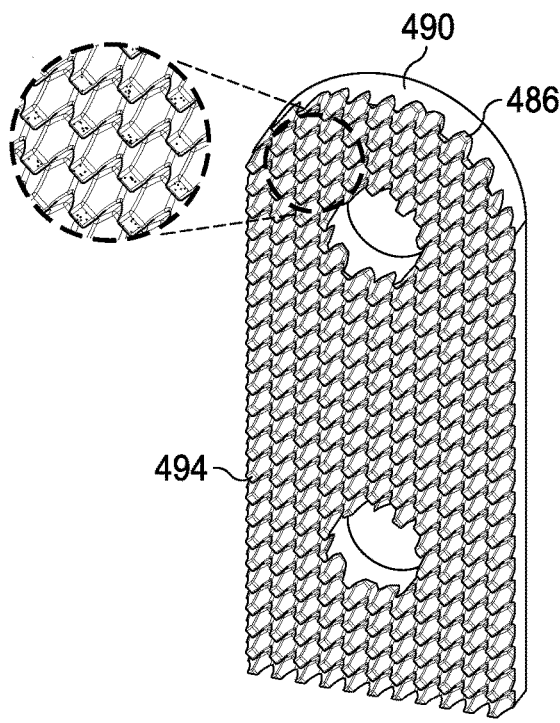

Referring to FIGS. 5A-5N in the drawings, various component alignment systems having differently shaped projections are schematically illustrated. In FIGS. 5A-5B, component alignment system 400 includes components 402, 404 having surfaces with shaped projections 406, 408, which have a square cross-sectional shape. Square shaped projections 406, 408 are not tilted to form diamonds, which may be desirable for setting the translational distance between quantized translational positions. For example, when square shaped projections 406, 408 are level as shown in FIGS. 5A-5B, the translational distance between the quantized translational positions along diagonal directions 410, 412 may be less than the horizontal translational distance between the horizontal quantized translational positions and the vertical translational distance between the vertical quantized translational positions. The amount by which to tilt square shaped projections 406, 408 may also depend on the expected direction of shear forces on components 402, 404.

In FIGS. 5C-5D, shaped projections 418 on surface 420 have a different cross-sectional shape than shaped projections 422 on surface 424. Shaped projections 422 are cylindrical projections. Shaped projections 418 include parallel walls 426 and parallel walls 428 that are orthogonal to parallel walls 426 to form square receiving sockets 430. In other embodiments, parallel walls 426 may be nonorthogonal to parallel walls 428 for nonsquare shaped receiving sockets. In the interlocked position, cylindrical shaped projections 422 are inserted into square receiving sockets 430. Differing the shape of shaped projections 418 from the shape of shaped projections 422 may be useful when each surface 420, 424 is manufactured using different technologies. For example, surface 420 may be formed from a manufacturing technology more suitable for forming walls while surface 424 may be formed using a manufacturing technology more suitable for forming cylinders. In another non-limiting example, surface 420 may include cylindrical or round holes instead of square receiving sockets.

In FIGS. 5E-5F, surfaces 436, 438 have shaped projections with differing shapes. Shaped projections 440 have a triangle cross-sectional shape and shaped projections 442 are cylindrical projections. Alternatively, shaped projections 440, 442 may both be cylindrical projections. Indeed, as shown in the illustrative embodiments, a wide variety and numerous combinations of shaped projections may be used in the component alignment systems. Surfaces 436, 438 also each have four fastener holes, illustrating that the component alignment systems of the illustrative embodiments may have any number of fastener holes in any configuration. In FIGS. 5G-5H, surfaces 448, 450 each include vertical rows of shaped projections 452, 454. Each shaped projection 452, 454 has a hexagonal cross-sectional shape. Surface 450 has two quantized rotational positions that are interlockable with surface 448 at the 0 degree and 180 degree positions. In FIGS. 5I-5J, hexagonal shaped projections 460, 462 are diagonally stacked. In other embodiments, hexagonal shaped projections 460, 462 may form horizontal rows. In yet other embodiments, hexagonal shaped projections 460, 462 may be nonstacked and spaced apart from one another to allow components 464, 466 to have quantized rotational positions spaced at 60 degrees. The size and spacing of the hexagonal shaped projections 460, 462 are proportional to the translational distance between the quantized translational positions at which components 464, 466 are interlockable. In FIGS. 5K-5L, surface 472 of component 474 has nontapered diamond shaped projections 476 and surface 478 of component 480 has tapered diamond shaped projections 482. In FIGS. 5M-5N, both surfaces 484, 486 of components 488, 490 have tapered diamond shaped projections 492, 494. The tapered shaped projections in FIGS. 5K-5N may have any cross-sectional shape such as a circle, ellipse, square, polygon, triangle or irregular shape that tapers from increasing to decreasing size. Tapered projections may, in some embodiments, allow for looser tolerances while still achieving a tight interlocking fit. Tapered projections may also provide additional tolerance as the two components come into initial contact before fully interlocking.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A component alignment system for an aircraft comprising:
    a first component having a first surface including a plurality of first shaped projections each having a triangle cross-sectional shape, the first shaped projections repeating in at least two directions along the first surface; and a second component having a second surface including a plurality of second shaped projections each having an inverted triangle cross-sectional shape, the second shaped projections repeating in at least two directions along the second surface;

wherein, the first shaped projections are complementary to the second shaped projections such that the first surface is translationally and rotationally constrained relative to the second surface when the first and second shaped projections are in an interlocked position;

wherein, the first surface is interlockable with the second surface in a plurality of quantized translational positions along at least two translational degrees of freedom; and wherein, the first surface is interlockable with the second surface in a single rotational position, the first surface noninterlockable with the second surface in rotational positions other than the single rotational position.

2. The component alignment system as recited in claim 1 wherein the aircraft further comprises a bay door and one of the first or second components further comprises a bay door switch.

3. The component alignment system as recited in claim 1 wherein each of the first and second shaped projections includes three projection interface surfaces configured to engage a respective adjacent projection interface surface of one of the shaped projections in the interlocked position.

4. The component alignment system as recited in claim 1 wherein the quantized translational positions have a quantum translational granularity of less than 0.1 inches.

5. The component alignment system as recited in claim 1 wherein the at least two translational degrees of freedom are parallel to the first and second surfaces.

6. The component alignment system as recited in claim 1 wherein the quantized translational positions are spaced apart by a translational distance proportional to a size of the first and second shaped projections.

7. The component alignment system as recited in claim 1 wherein the first shaped projections further comprise tapered projections.

8. The component alignment system as recited in claim 1 wherein the first and second shaped projections further comprise tapered projections.

9. The component alignment system as recited in claim 1 wherein the first surface forms a first fastener hole and the second surface forms a second fastener hole, the first and second fastener holes configured to receive a fastener to secure the first surface against the second surface; and wherein the second fastener hole is larger than the first fastener hole such that the fastener is undersized relative to the second fastener hole, thereby allowing for translational adjustment between the first and second components.

10. The component alignment system as recited in claim 1 wherein the first shaped projections have a uniform depth.

11. The component alignment system as recited in claim 1 wherein the first shaped projections have a nonuniform depth.

12. The component alignment system as recited in claim 1 wherein the first and second shaped projections have a uniform depth.

13. The component alignment system as recited in claim 1 wherein the first and second shaped projections have a nonuniform depth.

14. The component alignment system as recited in claim 1 wherein the first and second surfaces are additively manufactured surfaces.

15. The component alignment system as recited in claim 1 wherein the first and second surfaces are 3D printed surfaces.

* * * * *